Patented Sept. 17, 1946

2,407,943

UNITED STATES PATENT OFFICE 2,407,943

RESIN MOLDING COMPOSITION

George W. Whitehead, Springfield, Mass., assignor to Monsanto Chemical Company, St. Louis, Mo., a corporation of Delaware No Drawing. Application April 8, 1943, Serial No. 482,315

19 Claims. (Cl. 260—73)

The present invention relates to polyvinyl acetal resin molding compositions.

Polyvinyl acetal resins have heretofore found but little use in molding compositions due to several reasons, one of which is the notorious sticking of the molding powder to the mold. Another objection heretofore to the use of polyvinyl acetal resins in molding compositions has been the forming of laminations or layers thereof during injection molding processes.

An object of this invention is to provide a new molding composition.

Another object of this invention is to provide a new molding composition comprising a polyvinyl acetal resin which not only takes the form of the mold readily on the application of heat, but which may be readily removed from the mold, and which does not result in the forming of layers or laminations in an injection molded product.

Other and further objects of the present invention are to provide molded products having high water resistance, toughness, low shrinkage and marked resistance to heat.

More particularly, the present invention relates to molding compositions comprising polyvinyl acetal resins to which has been added glycolic acid.

Polyvinyl acetal resins may be prepared, for example, by hydrolyzing a polyvinyl ester, for example, polyvinyl acetate, and then reacting the resulting hydrolysis product with an aldehyde. U. S. patent to Morrison et al. Reissue No. 20,430 dated June 29, 1937 illustrates suitable general methods for preparing such resins. Polyvinyl acetal resins prepared in this manner may have a certain number of the ester groups, originally present in the polyvinyl ester, which have not been removed as well as a certain number of hydroxyl groups (which have replaced ester groups) which have not been replaced with acetal groups.

In accordance with the present invention, it has been found that as a result of incorporating glycolic acid in polyvinyl acetal resin molding compositions which tend to stick to the molds employed in forming polyvinyl acetal resin compositions under pressure, molded products are obtained that are readily removed from the molds and have other advantages set forth hereinafter.

The polyvinyl acetal resins contemplated according to the present invention are those that are water insoluble at room temperature. Molding compositions containing such resins tend to stick to the molds after molding, particularly to metal molds, for example, stainless steel or tool steel molds. More particularly, polyvinyl acetal resins in which the sum of the ester groups and twice the number of the acetal groups exceeds the number of the hydroxyl groups, are water insoluble and are contemplated by the present invention, particularly when the polyvinyl acetal resin contains at least 20% acetal on a chemical equivalent basis (each acetal group being chemically equivalent to two hydroxyl or two ester groups).

According to one embodiment of this invention, the polyvinyl acetal resins employed may be considered to be made up on a chemical equivalent basis of 0 to 40% ester groups and 5 to 40% hydroxyl groups (based on the sum of the hydroxyl, ester and twice the number of acetal groups) and the balance substantially acetal.

According to another embodiment of this invention, the polyvinyl acetal resins employed may be considered to be made up on a chemical equivalent basis of 0 to 30% ester groups and 10 to 25% hydroxyl groups (based on the sum of the hydroxyl, ester and twice the number of acetal groups) and the balance substantially acetal.

When the acetal is butyraldehyde acetal, according to one embodiment of this invention the polyvinyl acetal resin contains on a chemical equivalent basis 0 to 25% acetate groups, 15 to 40% hydroxyl groups and the balance substantialy butyraldehyde acetal.

When the acetal is acetaldehyde acetal, according to one embodiment of this invention the polyvinyl acetal resin contains, on a chemical equivalent basis, 5 to 25% acetate groups, 5 to 30% hydroxyl groups and the balance substantially acetaldehyde acetal.

When the acetal is formaldehyde acetal according to one embodiment of this invention the polyvinyl acetal resin contains, on a chemical equivalent basis, 3 to 20% acetate groups, 6 to 20% hydroxyl groups and the balance substantially formaldehyde acetal.

Polyvinyl acetal resins may be made from various aldehydes or mixtures thereof or even from ketones containing an active carbonyl group. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general polyvinyl acetal resins made from saturated lower aliphatic aldehydes are preferred. In particular polyvinyl acetal resins made with saturated aliphatic aldehydes containing less than 6 carbon atoms and especially those made with formaldehyde, acetaldehyde and butyraldehyde and mixtures thereof are preferred.

While the quantities of the glycolic acid employed according to this invention may be varied widely, it is generally preferred to employ relatively small amounts thereof. Furthermore, while I am not limited by any theories as to the mechanism of the invention, it is believed that chemical combination takes place between at least a portion of the acid and the polyvinyl acetal resin during the mixing or molding steps.

It is known to employ stearic acid in polyvinyl acetal molding compositions, but such use is generally unsatisfactory due to discoloration of the molded product and other undesirable features.

The following are given by way of specific examples and are not to be understood as limitative of the scope of the invention.

To portions comprising 100 parts by weight of a polyvinyl butyraldehyde acetal resin made from polyvinyl acetate and containing, on a chemical equivalent basis, about 0 to 2% acetate groups, 26 to 30% hydroxyl groups and the balance substantially butyraldehyde acetal, are separately added 1, 2, 4, 6 and 30 parts by weight respectively of glycolic acid and the resulting mass thoroughly mixed in a suitable manner, for example on mixing rolls and molded under heat and pressure in suitable compression and injection molding apparatus. The compositions all exhibit good compression and injection molding properties and are readily removed from the mold after cooling. Moreover, the molded products have a good surface finish and the injection molded articles do not exhibit laminations.

Molded products prepared in the same manner in the absence of glycolic acid stick to the molds and have a roughened surface finish. Injection molded articles exhibit undesirable formation of layers or laminations.

The polyvinyl butyraldehyde acetal resin given above may be employed in conjunction with glycolic acid together with suitable fillers and plasticizers and the resulting mixtures are found to exhibit the desirable molding properties typical of the present invention.

Thus, to 100 parts by weight of polyvinyl butyraldehyde acetal resin given above there are added 6 parts by weight of glycolic acid and 25 parts by weight of dibutyl phthalate. The resulting mixture is found to possess good compression and injection molding properties, and the molded product is readily removed from the mold.

As further specific examples of the present invention, to separate portions of 100 parts by weight of a polyvinyl formaldehyde acetal resin made from polyvinyl acetate and containing, on a chemical equivalent basis, about 6 to 8% acetate groups, 6 to 9% hydroxyl groups and the balance substantially formaldehyde acetal, there are added 2 parts by weight of glycolic acid and varying proportions by weight of dibutyl phthalate. Thus, separate mixes are formed containing 5, 10 and 15 parts by weight, respectively, of dibutyl phthalate. The mixes so formed are found to exhibit excellent molding properties and the molded products are free from any tendency to stick to the mold.

In all cases in the examples given above the molded products have a good finished surface and the injection molded articles do not exhibit the undesirable formations of layers or laminations.

As another modification of this invention, to 100 parts by weight of the polyvinyl butyraldehyde acetal resin as defined in the first example there is added 20 parts by weight of a dicarboxylic acid anhydride for example, phthalic anhydride, 10 parts by weight of dibutyl phthalate and 5 parts by weight of glycolic acid and the resulting mass mixed in a suitable manner and molded. The product exhibits good molding properties, is readily removed from the mold, and is an improvement in this respect over the same composition in the absence of an acid of this invention. This molded product is somewhat harder than similar molded compositions made in the absence of anhydride, due, it is believed, to a reaction taking place between the acetal resin and the anhydride.

In place of phthalic anhydride, other dicarboxylic acid anhydrides may be employed, for example, succinic anhydride and maleic anhydride. However, aromatic dicarboxylic acid anhydrides containing a single benzene nucleus are preferred.

As another example of the present invention, to separate portions of 100 parts by weight of polyvinyl acetaldehyde acetal resin made from polyvinyl acetate and containing, on a chemical equivalent basis, about 12% acetate groups, 10% hydroxyl groups and the balance substantially acetaldehyde acetal, are separately added 1, 2, 4, 8 and 12 parts by weight respectively of glycolic acid and the resulting mass thoroughly mixed on mixing rolls and molded in suitable compression and injection molding apparatus. The compositions all exhibit good compression and injection molding properties and are readily removed from the molds.

Another example of a polyvinyl acetal resin for use according to this invention is one containing, on a chemical basis, 19 to 21% acetate groups, 26 to 30% hydroxyl groups and the balance substantially butyraldehyde acetal.

As a further example of desirable polyvinyl acetal resins for use according to this invention are mixed acetaldehyde-butyraldehyde polyvinyl acetal resins, for example, those in which the molar ratio of acetaldehyde acetal groups to butyraldehyde acetal groups is between the limits of 1:3 and 3:1, particularly those in which 35–50 mol per cent are butyraldehyde acetal groups and 65–50 mol per cent are acetaldehyde acetal groups. Thus, a suitable acetal resin is one containing, on a chemical equivalent basis, about 20% hydroxyl groups, 3% acetate groups and the balance acetaldehyde and butyraldehyde acetal groups, in a molar ratio of 65–50% acetaldehyde and 35–50% butyraldehyde acetal groups.

By operating according to the present invention, molded products having increased water resistance, toughness, low shrinkage and resistance to heat are readily obtainable. Furthermore, as hereinbefore set forth acetal molding compositions containing the acid of this invention may contain additionally fillers and, if desired, suitable plasticizers.

Included within the scope of this invention are polyvinyl acetal resins made from polymerized vinyl esters of other acids than acetic acid, for example, formic acid, propionic acid and butyric acid, saturated lower aliphatic acids being preferred.

When the polyvinyl acetal resins made from polyvinyl acetate set forth in embodiments of this invention given above are prepared from other polyvinyl esters, the same molar percentages of ester and hydroxyl groups are employed.

What is claimed is:

1. A polyvinyl acetal resin pressure molding composition, having a decreased tendency to stick to a mold after molding, containing a water-insoluble polyvinyl acetal resin, and normally having a tendency to stick to a mold, to which has been added a sufficient proportion of glycolic acid effective to reduce the tendency to stick to a mold, said polyvinyl acetal resin containing at least 20% acetal on a chemical equivalent basis.

2. A molding composition as defined in claim 1 in which the polyvinyl acetal resin is a mixed aldehyde acetal resin.

3. A polyvinyl acetal resin pressure molding composition, having a decreased tendency to stick to a mold after molding, containing a polyvinyl acetal resin having on a chemical equivalent basis an ester group content up to 40%, a hydroxyl group content of 5 to 40%, and the balance substantially acetal, and normally having a tendency to stick to a mold, to which has been added a sufficient proportion of glycolic acid effective to reduce the tendency to stick to a mold.

4. A polyvinyl acetal resin compression or injection molding composition, having a decreased tendency to stick to a mold after molding, containing a polyvinyl acetal resin having, on a chemical equivalent basis, an ester group content up to 30%, a hydroxyl group content of 10 to 25% and the balance substantially acetal, and normally having a tendency to stick to a mold, to which has been added a sufficient proportion of a glycolic acid to reduce the tendency to stick to a mold.

5. A molding composition as defined in claim 3 in which said polyvinyl acetal resin is made with an aliphatic aldehyde.

6. A molding composition as defined in claim 3 in which said polyvinyl acetal resin is made with an aliphatic aledhyde having less than 6 carbon atoms.

7. A molding composition as defined in claim 3 in which said polyvinyl acetal resin is made with formaldehye.

8. A molding composition as defined in claim 3 in which said polyvinyl acetal resin is made with acetaldehyde.

9. A molding composition as defined in claim 3 in which said polyvinyl acetal resin is made with butyraldehyde.

10. A molding composition as defined in claim 3 to which has been added a sufficient proportion of a dicarboxylic acid anhydride to increase the hardness of the molded composition.

11. A molding composition as defined in claim 3 to which has been added a sufficient proportion of an aromatic dicarboxylic acid anhydride having a single benzene nucleus to increase the hardness of the molded composition.

12. A molding composition as defined in claim 3 to which has been added a sufficient proportion of phthalic anhydride to increase the hardness of the molded composition.

13. A polyvinyl acetal resin compression or injection molding composition, having a decreased tendency to stick to a mold after molding, containing a polyvinyl butyraldehyde acetal resin having, on a chemical equivalent basis, up to 25% acetate groups, 15 to 40% hydroxyl groups, and the balance substantially butyraldehyde acetal, and normally having a tendency to stick to a mold, to which has been added a sufficient proportion of glycolic acid effective to reduce the tendency to stick to a mold.

14. A molding composition as defined in claim 13 in which said polyvinyl butyraldehyde acetal resin contains, on a chemical equivalent basis about, up to 2% acetate groups, 26 to 30% hydroxyl groups, and the balance substantially butyraldehyde acetal.

15. A polyvinyl acetal resin compression or molding composition, having a decreased tendency to stick to a mold after molding, containing a polyvinyl acetaldehyde acetal resin having, on a chemical equivalent basis, from 5 to 25% acetate groups, 5 to 30% hydroxyl groups, and the balance substantially acetaldehyde acetal, and normally having a tendency to stick to a mold, to which has been added a sufficient proportion of glycolic acid effective to reduce the tendency to stick to a mold.

16. A molding composition as defined in claim 13 in which said polyvinyl acetaldehyde acetal resin contains on a chemical equivalent basis about 12% acetate groups, 10% hydroxyl groups and the balance substantially acetaldehyde acetal.

17. A polyvinyl acetal resin compression or injection molding composition, having a decreased tendency to stick to a mold after molding, containing a polyvinyl formaldehyde acetal resin having on a chemical equivalent basis from 3 to 20% acetate groups, 6 to 20% hydroxyl groups, and the balance substantially formaldehyde acetal, and normally having a tendency to stick to a mold, to which has been added a sufficient proportion of glycolic acid effective to reduce the tendency to stick to a mold.

18. A molding composition as defined in claim 15, in which said polyvinyl formaldehyde acetal resin contains on a chemical equivalent basis about 6 to 8% acetate groups, 6 to 9% hydroxyl groups and the balance substantially formaldehyde acetal.

19. A polyvinyl acetal resin pressure molding composition having a decreased tendency to stick to a mold after molding, containing a water-insoluble polyvinyl acetal resin, and normally having a tendency to stick to a mold, to which has been added a sufficient proportion of glycolic acid effective to reduce the tendency to stick to a mold, said polyvinyl acetal resin containing at least 20% acetal on a chemical equivalent basis and the sum of the ester and twice the number of the acetal groups in said polyvinyl acetal resin exceeding the number of the hydroxyl groups.

GEORGE W. WHITEHEAD.